(12) United States Patent
Hakimi et al.

(10) Patent No.: US 6,404,526 B2
(45) Date of Patent: Jun. 11, 2002

(54) WDM SYSTEM THAT USES NONLINEAR TEMPORAL GRATINGS

(75) Inventors: Farhad Hakimi; Hosain Hakimi, both of Watertown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/802,751

(22) Filed: Mar. 8, 2001

Related U.S. Application Data

(63) Continuation of application No. 09/722,080, filed on Nov. 22, 2000.
(60) Provisional application No. 60/222,708, filed on Aug. 3, 2000, and provisional application No. 60/244,298, filed on Oct. 30, 2000.

(51) Int. Cl.⁷ .......................... H04K 3/00; H04B 10/12; H04B 10/00
(52) U.S. Cl. .................. 359/161; 359/111; 359/173
(58) Field of Search ................ 359/111, 122, 359/126, 154, 161, 169, 173

(56) References Cited

U.S. PATENT DOCUMENTS

| | | | |
|---|---|---|---|
| 4,296,319 A | 10/1981 | Franks et al. ............... | 250/227 |
| 5,194,847 A | 3/1993 | Taylor et al. ............... | 340/557 |
| 5,502,588 A | 3/1996 | Abram ....................... | 359/154 |
| 5,508,845 A | 4/1996 | Frisken ...................... | 359/161 |
| 5,557,400 A | 9/1996 | Sorin et al. ................ | 356/73.1 |

FOREIGN PATENT DOCUMENTS

| | | |
|---|---|---|
| EP | 0 846 977 A2 | 6/1998 |
| WO | WO 00/11765 | 3/2000 |

OTHER PUBLICATIONS

Nijhof et al., "Stable soliton–like propagation in dispersion managed systems with net anomalous, zero and normal dispersion", *Electronics Letters*, vol. 33, No. 20, Sep. 25, 1997, pp. 1726–1727.

*Primary Examiner*—Leslie Pascal
*Assistant Examiner*—Dalzid Singh
(74) *Attorney, Agent, or Firm*—Fish & Richardson P.C.

(57) ABSTRACT

A method of generating a signal including: generating a first sequence of coherent optical pulses which are sufficiently close in spacing so as to overlap and interfere upon traveling a predetermined length down an optical fiber to form a first interference pattern with a first central lobe having a characteristic wavelength, wherein the energy of the pulses of the first sequence of pulses is within the non-linear regime of the optical fiber; manipulating the first sequence of optical pulses; in a similar manner generating a second sequence of coherent optical pulses; manipulating the second sequence of optical pulses; and introducing both the first and second manipulated sequences of pulses into the optical fiber, wherein the manipulating of the pulses of the first and the second sequence of pulses shifts the characteristic wavelengths of the first and second central lobes, respectively, to first and second transmission signal wavelengths.

19 Claims, 16 Drawing Sheets

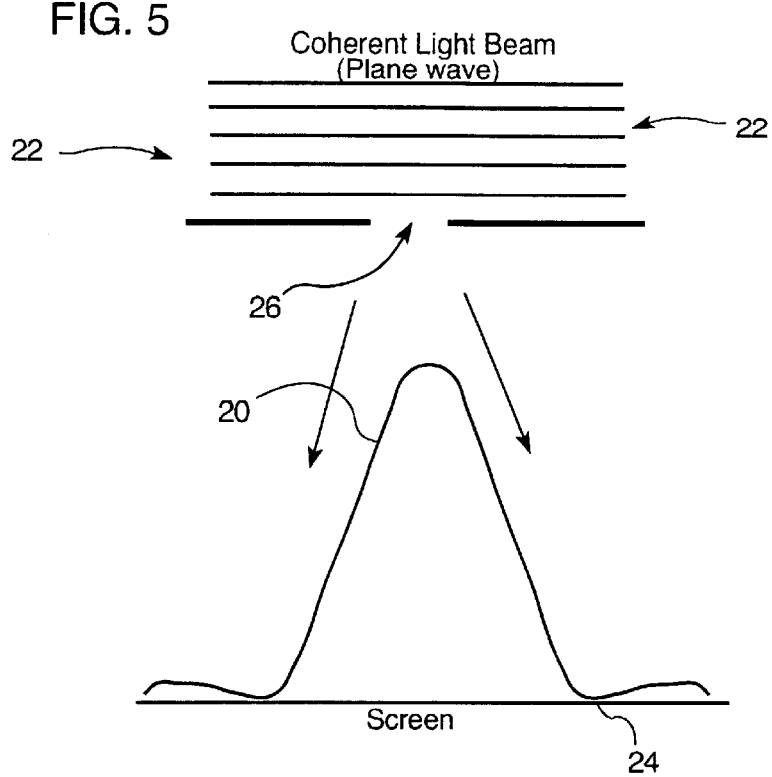
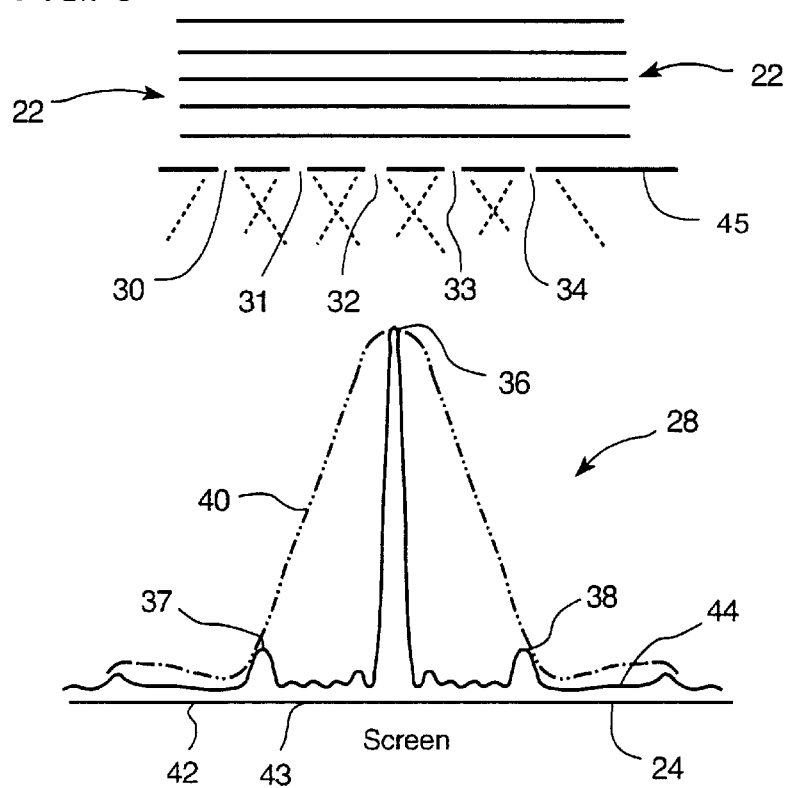

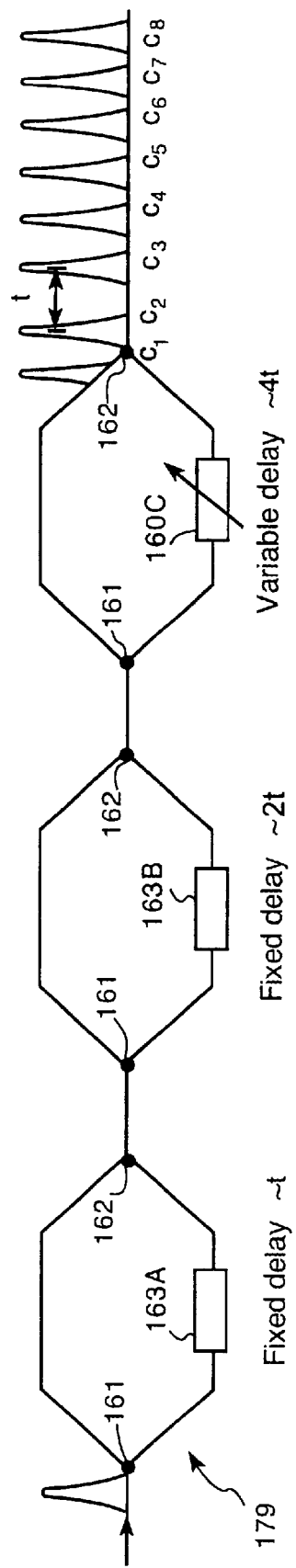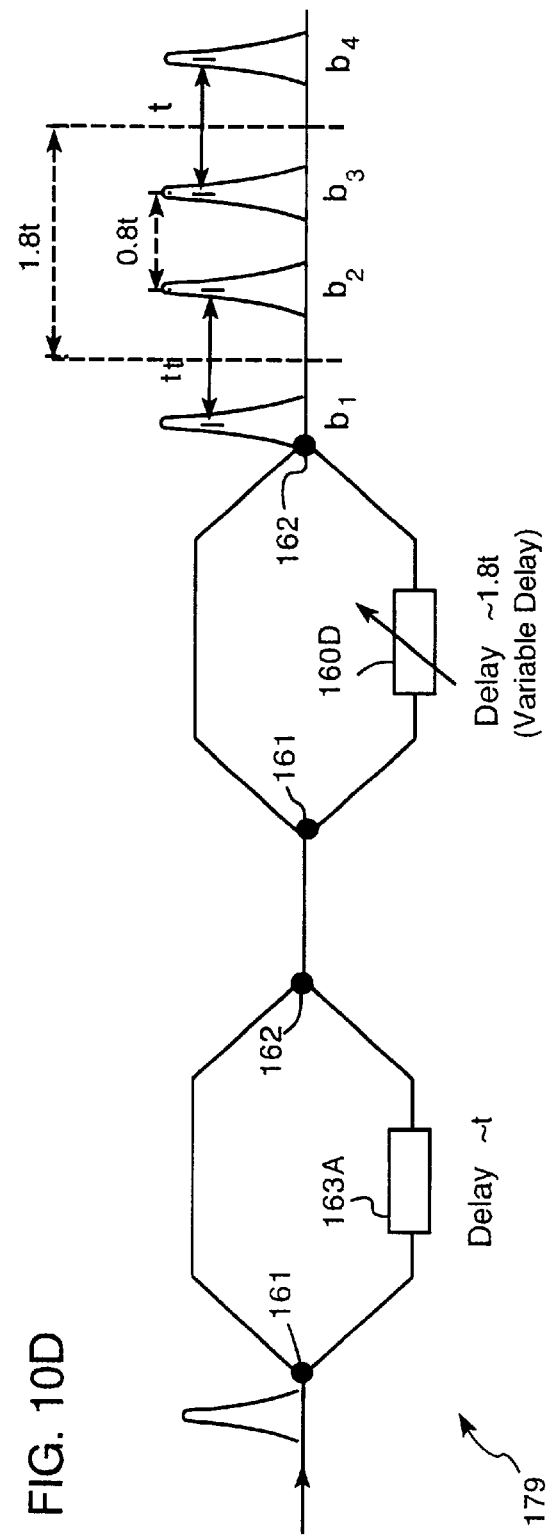
FIG. 10C
FIG. 10D

WDM SYSTEM THAT USES NONLINEAR TEMPORAL GRATINGS

This application is a continuation of U.S. Ser. No. 09/722,080, entitled "Nonlinear Temporal Grating As A New Optical Solitary Wave" filed Nov. 22, 2000 and which claims the benefit of U.S. Provisional Application No. 60/222,708, filed Aug. 3, 2000 and of U.S. Provisional Application No. 60/244,298, filed Oct. 30, 2000.

This invention was made with government support under Grant No. F19628-95-C-0002 awarded by the Air Force. The government has certain rights in the invention.

TECHNICAL FIELD

This invention relates generally to transmitting optical signals in optical fibers, and more particularly, to reducing pulse broadening in a nonlinear operating region of optical fiber transmission and ultra-fast optical switching.

BACKGROUND

FIG. 1 shows that an initial optical pulse 2 becomes a broader pulse 3 after traveling through an optical fiber 4. One source of broadening of pulse 2 results from dispersion. One cause of dispersion is a variation in a fiber's refractive index with wavelength. The fiber's refractive index is defined as the ratio of speed of light in vacuum to speed of light in the fiber. The refractive index variations make longer and shorter wavelength components of pulse 2 travel at different speeds in optical fiber 4. After traveling through a certain length of optical fiber 4, the speed variations produce broader pulse 3. Another cause of dispersion is waveguide dispersion, which is induced by the geometric configuration of fiber 4.

Pulse broadening can affect the quality of digital data transmission in optical fiber 4. Digital data is transmitted as a series of optical pulses. Each temporal interval for a pulse may represent one binary bit. For example, a data format called On-Off Keying (OOK) indicates the binary states "1" and "0" corresponding to the presence and absence of a pulse, respectively. As pulses broaden and overlap, a receiver may not be able to determine whether a pulse is present in a particular time interval or whether a detected optical signal is the tail of a previous or subsequent pulse. Inserting an amplifier 5 into optical fiber 4 can help to reduce receiver errors due to propagation weakening of pulse intensities. But, amplifier 5 does not help to reduce receiver errors caused by the dispersion-generated pulse broadening and overlap.

Present optical fiber communications typically use optical pulses having wavelengths of about 1.5 microns, because erbium-doped fibers can provide quality optical amplification at 1.5 microns. Unfortunately, many older optical fibers produce significant chromatic dispersion in optical signals at 1.5 microns. This chromatic dispersion produces significant pulse broadening, which limits transmission wavelengths and distances in contemporary optical networks.

The refractive index of fiber 4 also varies with the magnitude of electric field $\in$ of pulse 2. For symmetric molecules, such as silica glasses of which most optical fibers are made, the first-order $\in$ dependent term in the refractive index vanishes. The higher-order terms of $\in$, $\in^2$, in particular, in the refractive index produce most of the nonlinear effects in optical fibers. When the intensity in pulse 2 is low, the higher-order terms of $\in$ in the refractive index only have negligible effects, and therefore pulse 2 is in a linear operating region of fiber 4. When the intensity of pulse 2 is sufficiently high, the higher-order terms of $\in$ become non-negligible and cause pulse 2 to enter a nonlinear region of operation of fiber 4.

A notable manifestation of the nonlinear operation of fibers is self-phase modulation (SPM). SPM generally causes a pulse to broaden in spectrum while the pulse is propagating in the nonlinear operation region of a fiber. However, the effects of spectral broadening caused by SPM may counterbalance the effects of chromatic dispersion with the result that the pulse retains its shape.

The chromatic dispersion is characterized by a second order chromatic dispersion parameter $\beta_2$, which is a function of the pulse's wavelength and derivatives of the fiber's refractive index with respect to the wavelength. If $\beta_2$ is negative, the pulse is said to be propagating in an anomalous dispersion regime of the fiber. In the anomalous dispersion regime, the SPM causes the leading edge of the pulse to travel slower than its trailing edge, thus effectively compressing the pulse and balancing out the pulse broadening induced by the second order chromatic dispersion.

A pulse propagating in the fiber with balanced SPM and chromatic dispersion is a form of solitary wave called a soliton. Ideally, a soliton may travel a long distance while retaining its shape and spectrum. However, a soliton is susceptible to amplitude fluctuations, which may be caused by, for example, the amplifiers that are required along the fiber. The amplitude fluctuations generate frequency shifts, which in turn cause Gordon-Haus time jitters due to different frequencies traveling at different velocities. The frequency shifts and Gordon-Haus time jitters are detrimental to a data transmission system. In a wave-length division multiplexing (WDM) system, frequency shifts produce undesired emissions outside of the allotted frequency band assigned to each channel, and the undesired emissions may interfere with other channels or other systems; while time jitters create problems of data clock recovery at a receiver or regenerator site, because data bits represented by the optical pulses may not be synchronized due to the timing uncertainties.

Time jitters can be reduced by inserting sliding filters in strategically chosen locations along the fiber span. Another method to reduce time jitters is a dispersion-managed soliton technique that uses dispersion compensating fibers, which have dispersion characteristics tuned to compensate for the time jitters along the fiber span. The overall average dispersion characteristicis, on the other hand, is designed to counterbalance the SPM.

Even with dispersion management, any soliton, when traveling far enough into a fiber, surrenders to an effect called third order dispersion (TOD). TOD causes the soliton to spread unsymmetrically in the temporal domain into a widened, non-symmetrical pulse. FIGS. 2 illustrates the TOD effects on a soliton. FIG. 2 shows a soliton pulse after being unsymmetrically spread by TOD.

Some implementations allow a soliton to travel over long distance with optical regenerators. The design of regenerators, for example, optical 2R (re-shape and re-time) or 3R (re-shape, re-time and re-amplify), involves complicated issues such as polarization sensitivities, cost and complexities.

SUMMARY

In general, in one aspect, the invention is a method of generating a signal pulse in an optical fiber characterized by dispersion and a refraction index that has a nonlinear regime of operation. The method involves generating a sequence of coherent optical pulses each of which has an associated energy; and introducing the sequence of pulses into the optical fiber, wherein the pulses in the sequence of pulses are sufficiently close in spacing so that after traveling a predetermined length down the optical fiber, the pulses of the sequence of pulses overlap and interfere to form an interference pattern. The associated energy of at least one of the pulses of the sequence of pulses is within the nonlinear regime of the optical fiber.

In general, in another aspect, the invention is a method of generating a signal pulse in an optical fiber that involves generating a sequence of coherent optical pulses each of which has an associated energy; and introducing the sequence of pulses into the optical fiber, wherein the pulses in the sequence of pulses are sufficiently close in spacing so that after traveling a predetermined length down the optical fiber, the pulses of the sequence of pulses overlap and interfere to form an interference pattern having a central lobe and multiple side lobes. The interference pattern is characterized by a contrast ratio, and the associated energy of each pulse of the sequence of pulses is sufficiently high relative to characteristics of the optical fiber so as to cause the contrast ratio of the interference pattern to increase as the interference pattern propagates further along the optical fiber.

In general, in still another aspect, the invention is a method of generating a signal pulse in an optical fiber that involves generating a sequence of coherent optical pulses each of which has an associated energy; and introducing the sequence of pulses into the optical fiber, wherein the pulses in the sequence of pulses are sufficiently close in spacing so that after traveling a predetermined length down the optical fiber, the pulses of the sequence of pulses overlap and interfere to form an interference pattern having a central lobe and multiple side lobes. The associated energy of each pulse of the sequence of pulses is sufficiently high relative to characteristics of the optical fiber so as to cause energy from the side lobes to transfer into the central lobe as the interference pattern propagates further along the optical fiber.

Preferred embodiments include one or more of the following features. Each of the pulses of the sequence of pulses has energy that is within the nonlinear regime of the optical fiber. The sequence of pulses may include only two pulses or it may include more than two pulses. The generating of a sequence of coherent optical pulses involves supplying a continuous wave laser beam; and chopping the continuous wave laser beam to produce the sequence of optical pulses. Alternatively, the method of generating the sequence of coherent optical pulses involves supplying a single coherent optical pulse; and producing the sequence of optical pulses from the single optical pulse.

In general in still another aspect, the invention is a system for generating a signal pulse in an optical fiber characterized by dispersion and a refraction index that has a nonlinear regime of operation. The system includes a source of coherent laser energy; and a transmitter for coupling to the optical fiber and which during operation, receives the laser energy from the source and outputs a sequence of coherent optical pulses. The transmitter is configured to generate the pulses in the sequence of pulses with sufficiently close spacing so that after traveling a predetermined length down the optical fiber, the pulses of the sequence of pulses overlap and interfere to form an interference pattern. The transmitter is also configured to generate at least one pulse of the sequence of pulses to have an energy that is within the nonlinear regime of the optical fiber.

Preferred embodiments include one or more of the following features. The transmitter is configured to generate each of the pulses of the sequence of pulses to have an energy that is within the nonlinear regime of the optical fiber. The sequence of pulses may include only two pulses or it may include more than two pulses. If the source of coherent laser energy provides a continuous wave optical beam, the transmitter might then include an optical shutter that during operation chops the continuous optical beam to produce the sequence of optical pulses. Alternatively, it the source of coherent light supplies a single coherent optical pulse, then the transmitter might include a splitter that receives the single pulse, a plurality of optical paths connected to an output of the splitter, each of the plurality of optical paths characterized by a different delay, and a combiner receiving each of the plurality of optical paths and during operation outputting the sequence of optical pulses.

In general, in yet another aspect, the invention is a method of generating a signal for transmission down an optical fiber characterized by dispersion and a non-linear regime of operation. The method includes: generating a first sequence of coherent optical pulses each of which has an associated energy, wherein the pulses in the first sequence of optical pulses are sufficiently close in spacing so that upon traveling a predetermined length down the optical fiber, the pulses of the first sequence of pulses will overlap and interfere to form a first interference pattern with a first central lobe having a characteristic wavelength, and wherein the associated energy of at least one of the pulses of the first sequence of pulses is within the non-linear regime of the optical fiber; and manipulating the pulses of the first sequence of optical pulses to generate a first manipulated sequence of pulses. It further includes generating a second sequence of coherent optical pulses each of which has an associated energy, wherein the pulses in the second sequence of optical pulses are sufficiently close in spacing so that upon traveling a predetermined length down the optical fiber, the pulses of the second sequence of pulses will overlap and interfere to form a second interference pattern with a second central lobe having a characteristic wavelength, and wherein the associated energy of at least one of the pulses of the second sequence of pulses is within the non-linear regime of the optical fiber; and manipulating the pulses of the second sequence of optical pulses to generate a second manipulated sequence of pulses. The method also includes introducing both the first manipulated sequence of pulses and the second manipulated sequence of pulses into the optical fiber, wherein the manipulating of the pulses of the first and the second sequence of pulses shifts the characteristic wavelengths of the first and second central lobes, respectively, to first and second transmission signal wavelengths.

In general, in still yet another aspect, the invention features an apparatus for sending optical signals down an optical fiber characterized by dispersion and a non-linear regime of operation. The apparatus includes: a first optical signal source which during operation generates a first sequence of coherent optical pulses each of which has an associated energy, wherein the pulses in the first sequence of optical pulses are sufficiently close in spacing so that upon traveling a predetermined length down the optical fiber, the pulses of the first sequence of pulses will overlap and interfere to form a first interference pattern with a first central lobe having a characteristic wavelength, and wherein the associated energy of at least one of the pulses of the first sequence of pulses is within the non-linear regime of the optical fiber; a frequency shifter which during operation manipulates the pulses of the first sequence of optical pulses to generate a first manipulated sequence of pulses; a second optical signal source which during operation generates a second sequence of coherent optical pulses each of which has an associated energy, wherein the pulses in the second sequence of optical pulses are sufficiently close in spacing so that upon traveling a predetermined length down the optical fiber, the pulses of the second sequence of pulses will overlap and interfere to form a second interference pattern with a second central lobe having a characteristic wavelength, and wherein the associated energy of at least one of the pulses of the second sequence of pulses is within the non-linear regime of the optical fiber; a second frequency shifter which during operation manipulates the pulses of the second sequence of optical pulses to generate a second manipulated sequence of pulses; and a wavelength division multiplexer system which during operation receives both the first manipulated sequence of pulses and the second manipulated sequence of pulses and introduces them into the optical fiber, wherein the first and second frequency shifters shift the characteristic wavelengths of the first and second central lobes, respectively, to first and second transmission signal wavelengths.

Embodiments may have one or more of the following advantages. A new optical solitary wave, the hyper-soliton, is discovered for transmitting in the non-linear operating region of an optical fiber. The hyper-soliton does not spread as it travels down the fiber, and carries digital signals over a broad frequency range. Further aspects, features and advantages will become apparent by the following.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 illustrates diffraction broadening caused by a wide slit;

FIG. 6 illustrates multi-slit interference;

FIGS. 10A–C illustrate Mach-Zehnder interferometers;

FIG. 10D illustrates how the variable delay component of the interferometer adjusts the delay between pulses;

Like reference symbols in the various drawings indicate like elements.

DETAILED DESCRIPTION

The present invention is based, in part, on a multi-pulse technique which we developed to reduce the pulse broadening effects of dispersion on a transmitted pulse. Our multi-pulse technique involves generating for each pulse to be transmitted a series of closely spaced coherent pulses and then sending that series of closely spaced pulses down the fiber. According to the multi-pulse technique, the individual pulses within the series of pulses are selected to have amplitudes that are within the linear operating region of the fiber and they are spaced closely enough to interfere with each other as they broaden. The technique is described in detail in U.S. patent application Ser. No. 09/282,880, entitled "Quasi-Dispersionless Optical Fiber Transmission, Dispersion Compensation and Optical Clock," incorporated herein by reference. To lay the groundwork for discussing the present invention, we will first present an overview of the multi-pulse technique.

Figure 1:
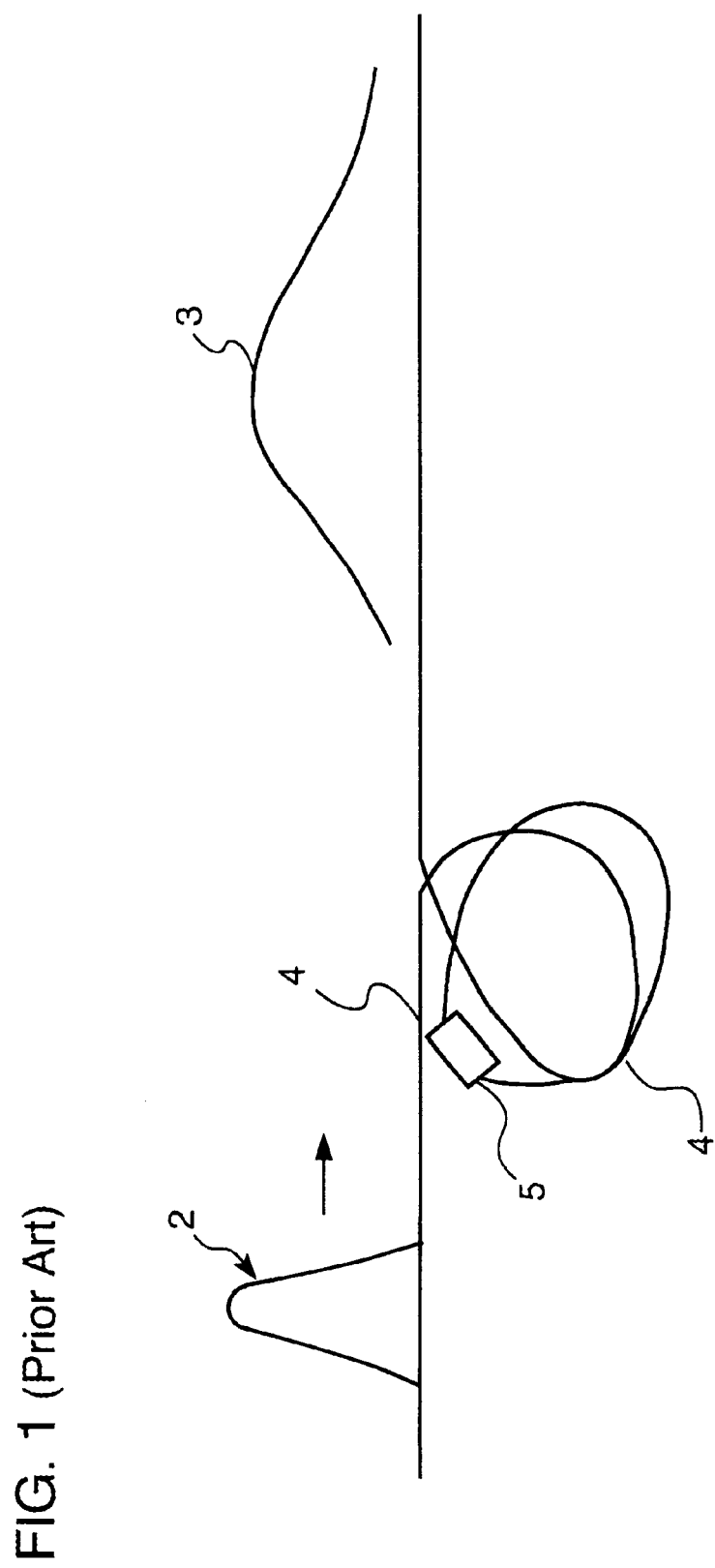
FIG. 1 illustrates pulse broadening in a prior art optical fiber.
Figure 2:
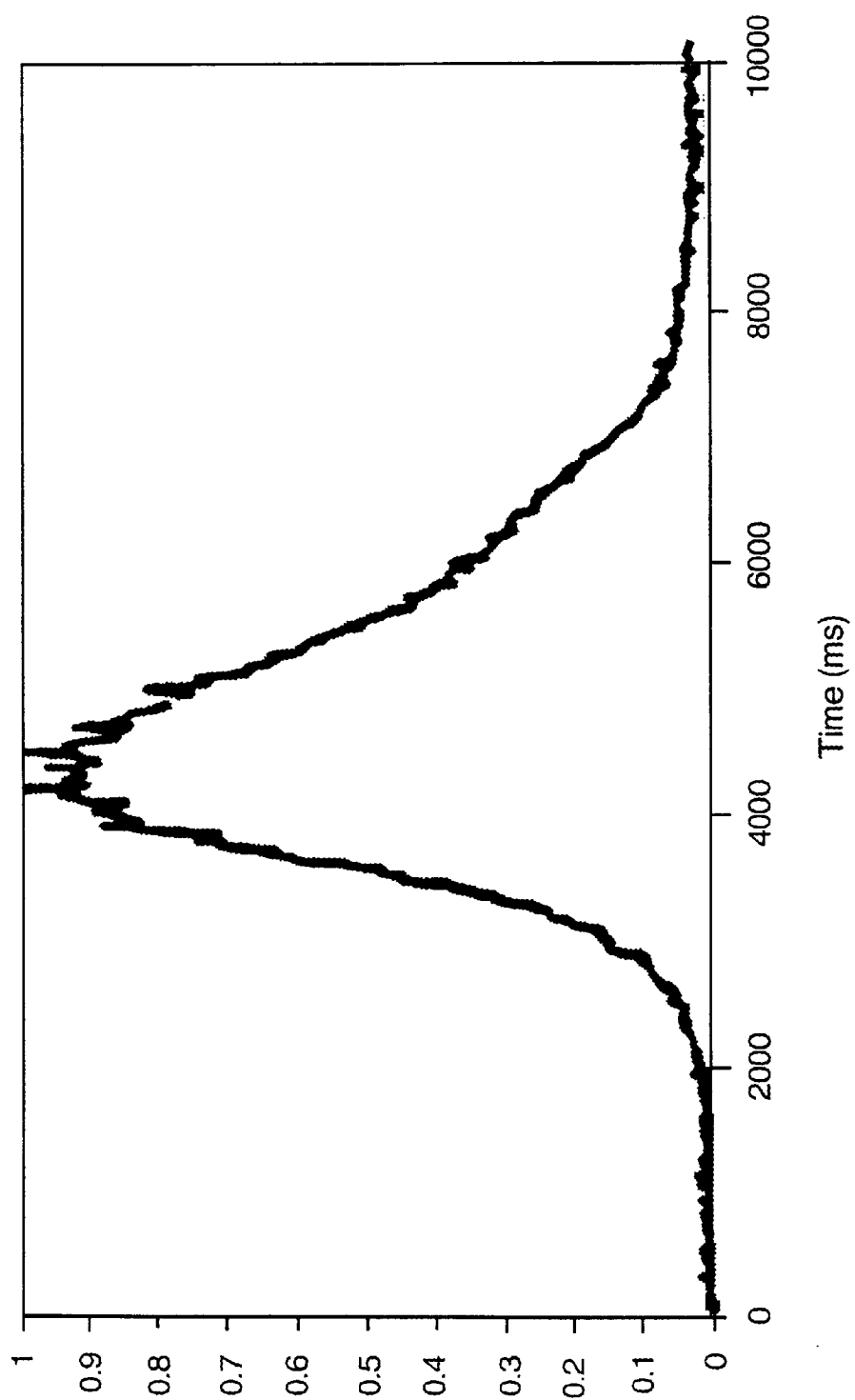
FIG. 2 shows a soliton pulse after being spread by TOD.
Figure 3:
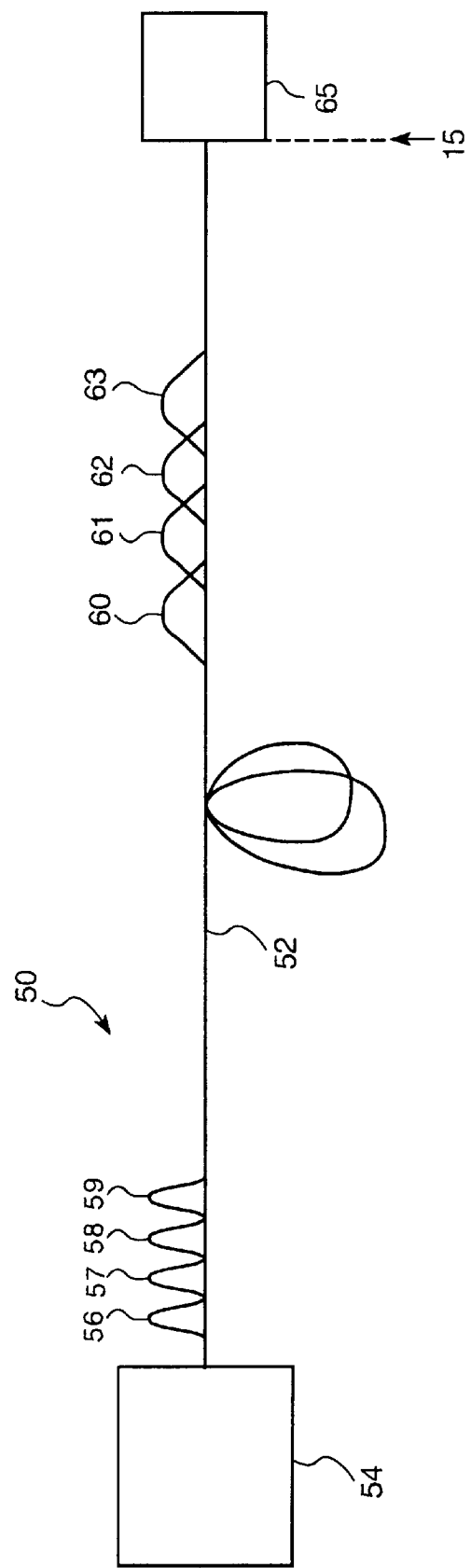
FIG. 3 shows a system, which uses interference to reduce pulse broadening in a linear operating region of an optical fiber.

FIG. 3 schematically illustrates a system 50 which implements the multi-pulse technique. It includes an optical transmitter 54 connected to a receiver 65 at a distant location 15 via an optical fiber 52. Transmitter 54 generates a sequence of coherent, closely spaced pulses 56–59 and sends them into optical fiber 52. Each of the pulses 56–59 has a nonzero time delay with respect to the preceding pulse in the sequence of pulses. As each of the pulses 56–59 moves down the fiber 52, it will broaden due to dispersion in the fiber. If the original pulses in the sequence are spaced closely enough, as they broaden, they will overlap and will interfere with each other. For example, pulses 57 and 58 broaden to become overlapping pulses 61 and 62 after a certain propagation distance.

Figure 4:
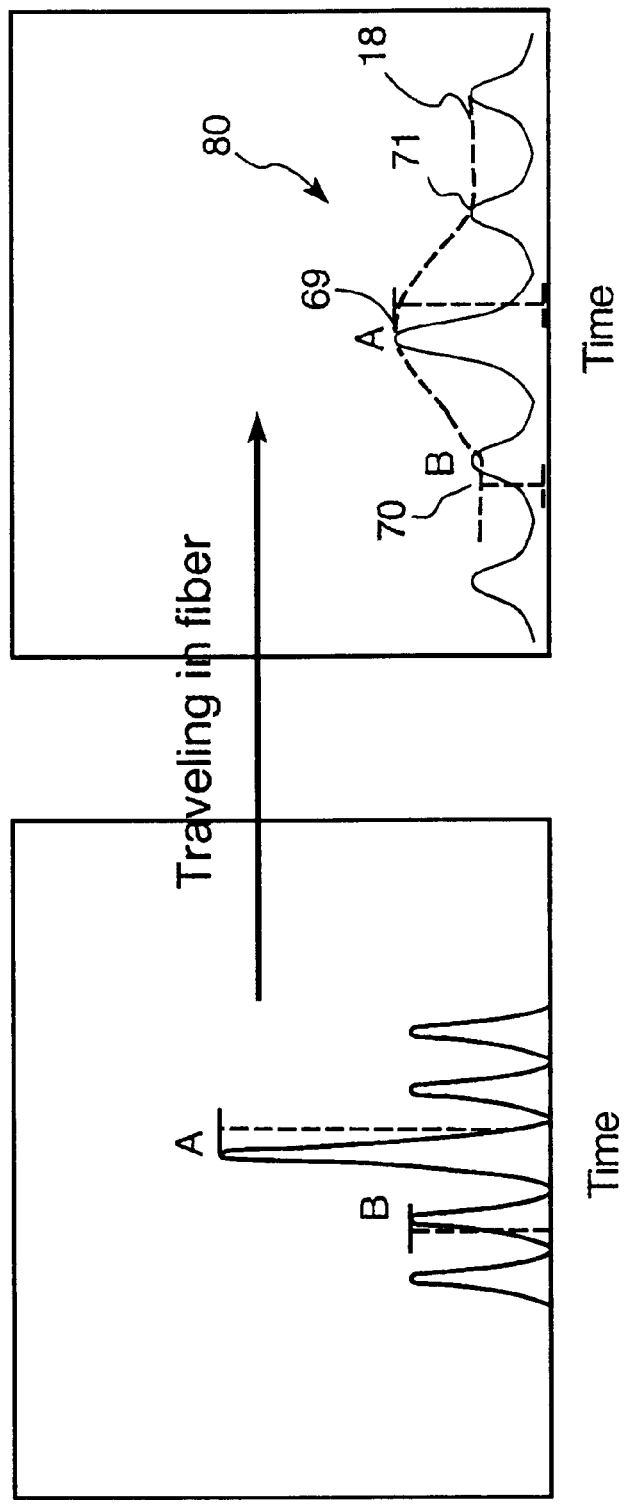
FIG. 4 illustrates an interference pattern produced from the system of FIG. 3.

FIG. 4 shows an example of the resulting interference pattern 80 that is produced by the overlapping coherent pulses. Note that the interference pattern typically has a narrow central lobe 69 and multiple side lobes 70 and 71 of lower amplitude. The peaks of central lobe 69 and side lobes 70 and 71 fall under an envelope 18, which matches the shape of a broadened pulse that would result from sending one of the pulses 56–59 down fiber 52. Effectively, the sequence of coherent pulses 56–59 forms a single pulse (i.e., central lobe 69) that is able to broaden less rapidly when propagating through fiber 52. The reason for the slower rate of spreading is because the pulse sequence acts as a spectral filter on the resulting single pulse. However, distortions introduced by the spectral filter can have an irreversible effect on the spectrum of the transmitted pulse, which is inversely proportional to its temporal duration. Therefore, with spectral filtering, it may be not possible to recover the temporal duration of the transmitted pulse, which is a drawback that can reduce the potential data rate of the transmission system.

Referring to FIGS. 3 and 4, central lobe 69 is extracted or detected by a nonlinear device at receiver 65, e.g., an intensity discriminator. The nonlinear device, using a threshold that is higher than the side lobes but lower than the central lobe, detects the existence of the higher central lobe and ignores the lower amplitude side lobes. It should be clear that effective operation of this system depends on there being sufficient contrast between the central lobe and the other side lobes and any undesired noise that might be present. Also note that if only a single pulse had been transmitted down the fiber, the pulse broadening effect of dispersion would probably have produced a low amplitude, wide pulse by the time it reached the receiver. The wider, lower pulse would have been difficult if not impossible to detect over the noise.

We also note that when the sequence of pulses is in the linear region of the fiber, the contrast ratio of the central lobe to the side lobes remain the same as the pulse sequence travels down the fiber (as shown in FIG. 4), even though temporal waveform of the pulse sequence is being stretched due to dispersion. We make this observation at this point because as will become apparent later when the signal is in the non-linear region of the fiber, the contrast ratio of the pulse sequence no longer remains the same when it propagates down the fiber.

It is useful to observe that interference pattern 80 is similar to the intensity pattern that is produced by coherent plane wave light after passing through a multiple aperture grating and the envelope 18 is similar to the intensity pattern produced by a coherent light beam after passing through a single slit aperture. The diffraction effect of a single aperture is illustrated in FIG. 5 which shows an intensity pattern 20, which a coherent light beam 22 makes on a screen 24 located in the far field behind a wide slit 26. If the slit 26 is not too wide, diffraction broadens the intensity pattern 20 to beyond the width of the slit 26.

The interference pattern produced by a multiple aperture grating is illustrated in FIG. 6 which shows an intensity pattern 28, which the coherent light beam 22 produces on the screen 24 when located behind multiple narrow slits 30–34. The intensity pattern 28 has lobes 36–38 and minima 42–44 due to interference between light waves from the different slits 30–34. The interfering light impinging on screen 24 is characterized by a central lobe 36 and multiple side lobes 37, 38. Central lobe 36, as in the case of the sequence of coherent pulses traveling down a fiber, is much narrower than the diffraction-widened pattern 20 from the wide slit 26 of FIG. 5. And the envelope 40 of the peaks of the multiple lobes of the interference pattern 28 matches the pattern 20 from the wide slit 26 of FIG. 5.

In other words, the sequence of closely spaced coherent pulses that produce the multi-lobe interference pattern in the fiber might be viewed as having associated therewith a temporal grating (TG) much like the spatial grating that also produces a multi-lobe interference pattern.

By increasing the energy in pulses 56–59 so that they are in the nonlinear region of the fiber, significant performance enhancements are achieved. In essence, when the system is operated in the nonlinear region, the central lobe of the resulting interference pattern increases in height and the side lobes are significantly suppressed in comparison to the interference pattern that is produced when operating within the linear region. Continuing the grating analogy mentioned above, the nonlinear mode of operation is like associating with the sequence of pulses a nonlinear temporal grating (NTG). This results in a new type of solitary wave that we call a hyper-soliton and that is fundamentally different from temporal grating pulse. Unlike the central lobe of temporal grating, the central lobe of the nonlinear temporal grating (i.e., hyper-soliton) would not spread as the pulse travels down the fiber. In that respect, it is similar to a soliton. The transformation from temporal grating to hyper soliton (nonlinear temporal grating) is akin to the transformation from return-to-zero (RZ) pulse transmission to soliton transmission in a fiber optic link. We will refer hereinafter to the sequence of pulses that operate within the nonlinear region of the fiber as HS (hypersoliton) pulses.

Figure 7:
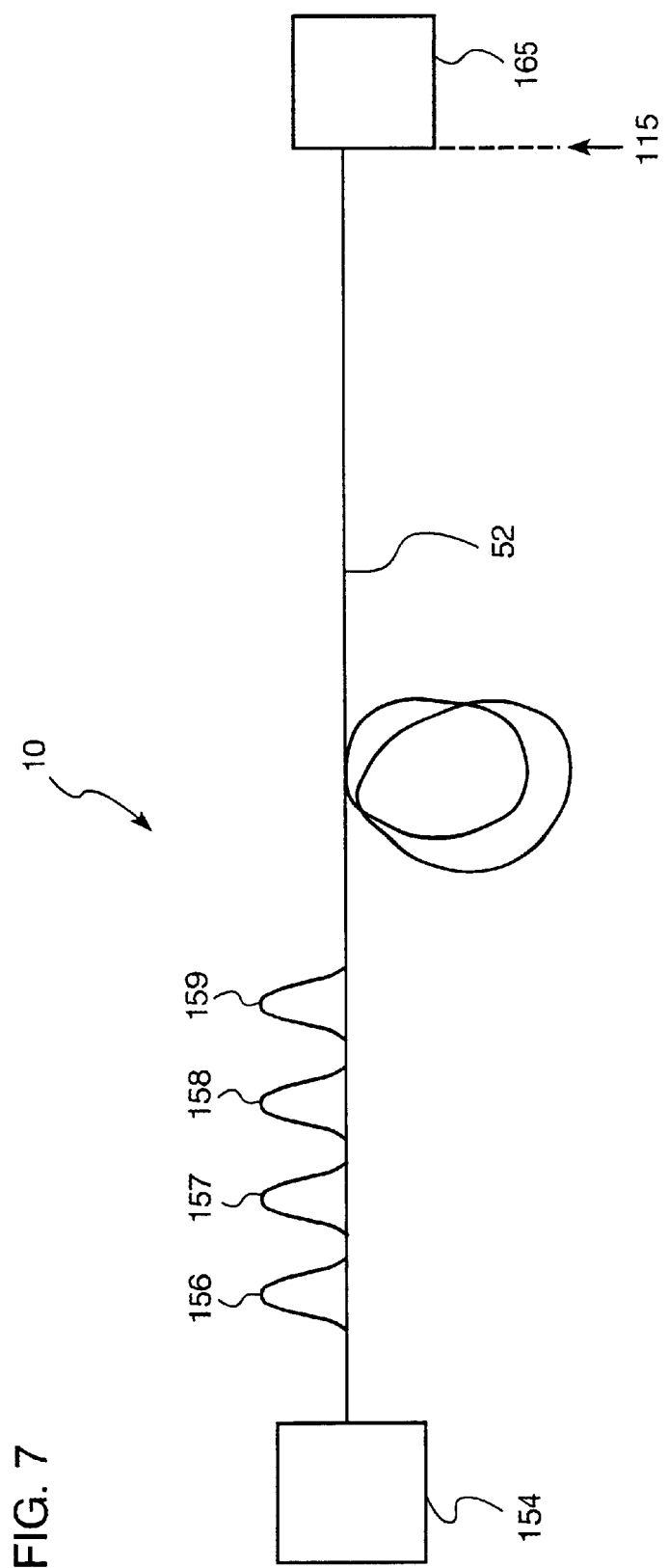
FIG. 7 shows a system, which uses interference to reduce pulse broadening in a nonlinear operating region of an optical fiber.

A system which operates in the nonlinear region is shown in FIG. 7. Like the previously described system, it includes a transmitter 154 connected to a receiver 165 over an optical fiber 52. In this case, however, transmitter 154 generates a series of coherent pulses 156–159 that are within the nonlinear region of fiber 52. Because operation in the nonlinear region produces an interference pattern with an enhanced central lobe, receiver 165 does not require and therefore does not include an intensity discriminator to isolate the central pulse of the interference pattern from the side lobes.

For this mode of operation, the energy in each of the pulses 156–159 needs to be above an energy threshold which defines a lower boundary for the nonlinear operating region of fiber 52. The energy threshold of a pulse in a given fiber can be determined by a nonlinear phase shift that is produced within the pulse. When the energy of a pulse causes the nonlinear phase shift to be $\pi$ or larger, the energy of the pulse has exceeded the energy threshold and the pulse has entered the nonlinear region of the fiber. More specifically, the energy threshold can be derived from an equation that defines the relationship between the energy E and the non-linear phase shift $\phi$. The equation generally includes factors such as fiber and pulse characteristics. The equation is $\phi = 2\pi\, n_2\, EL/(\lambda \tau\, A)$, where $n_2$ is the non-linear Kerr coefficient ($n_2 = 3.2 \times 10^{-20}$ meter square/watts), E is the pulse energy in watts x second, L is the length of the fiber (meter), $\lambda$ is the wavelength (meter), $\tau$ is the pulse width (second), and A is the effective fiber core area (meter square) in the propagating mode field.

Figure 8:
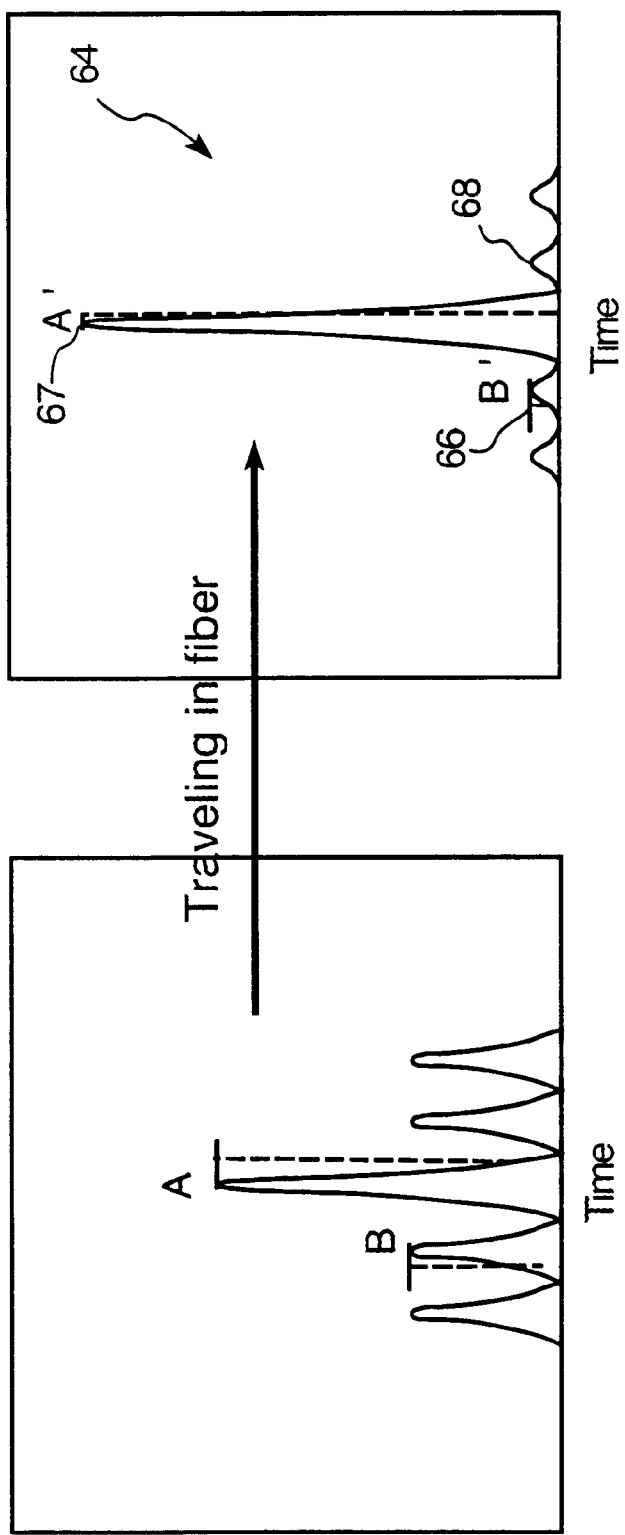
FIG. 8 illustrates an interference pattern produced from the system of FIG. 7.

As in the case of the lower energy pulses, the HS pulses after traveling a sufficient distance overlap and produce an interference pattern such as is shown in FIG. 8. That sufficient distance is several times the characteristic length which is equal to $\tau^2/\beta_2$, where $\tau$ is the pulse duration, and $\beta_2$ is the second order chromatic parameter of the system.

The nonlinearity acts to concentrate the energy of the multiple pulses into central lobe 67 of the interference-generated pattern 64 and draws energy away from the side lobes 66, 68 thereby suppressing the side lobes and increasing the central lobe, which, in turn, increases the contrast between central lobe 67 and side lobes 66,68, as previously noted. Compared with the interference pattern resulting from linear operation, the HS interference pattern has a significantly higher contrast ratio. Moreover, the narrow central lobe of the interference pattern retains its shape as it propagates down the fiber. The HS pulses not only balance the SPM and the second-order chromatic dispersion like a soliton, but also remain substantially unaffected by the presence of TOD and higher-order dispersions. Unlike a soliton that must be transmitted in the anomalous dispersion regime to retain its shape, the HS pulses may be transmitted in either the normal dispersion regime or the anomalous dispersion regime.

Referring again to FIG. 8, it should be noted that in nonlinear regime the shape of waveforms in both time and frequency domains evolve in a similar manner as the pulse sequence travels.

The advantages of transmitting HS pulses are numerous. For example, HS pulses are robust and resistant to polarization mode dispersion (PMD) of any installed optical fiber link. PMD is a result of random birefringence in the fiber, and is a major problem in a high-speed long haul system.

Furthermore, HS pulses are immune to frequency shifts and time jitters, both of which, as explained in the background, are detrimental to a transmission system. Because HS pulses effectively result from applying a spectral filter that travels with a soliton, the filter removes any frequency shifts and time jitters that would otherwise have been present in the HS pulses.

There are a number of different ways to generate the HS pulses, some of which will now be described. In general, transmitter 154 includes a laser source and one or more programmable or configurable components that produce sequences of pulses with desired spacing and amplitude. If the pulses are to carry encoded digital data, an encoder will also be included in transmitter 154. The laser source may be a continuous-wave (CW) laser that generates a monochromatic coherent light beam In that case, a programmable optical shutter chops the light from the CW laser to produce a sequence of mutually coherent pulses.

Figure 9:
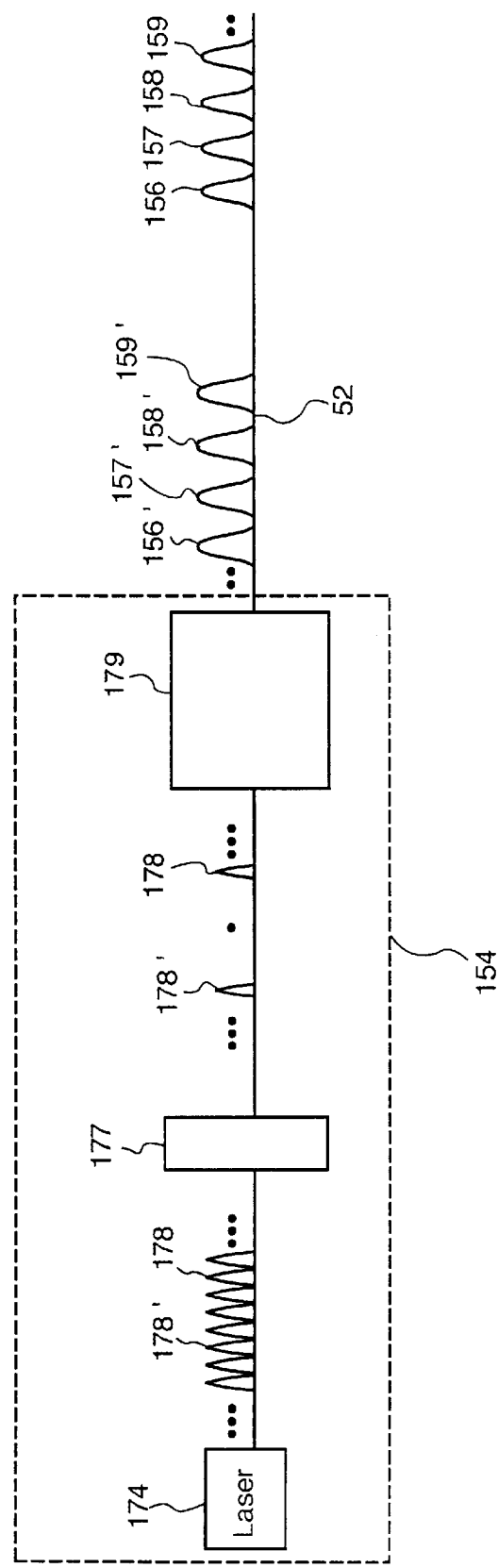
FIG. 9 shows an optical transmitter for use in the system of FIG. 7.

Alternatively, referring to FIG. 9, a pulse laser source 174, e.g. a 10 GHz pulse laser, may be used to generate a sequence of equally-spaced narrow pulses that may be spaced more closely than desired. In that case, a programmable optical shutter 177 allows some of the pulses to pass (178 and 178') while blocking out other pulses in order to generate a sequence of more widely spaced narrow pulses. The distance between the pulses, e.g., pulses 178 and 178', should be great enough to avoid one pulse from interfering with a neighboring pulse after dispersion widening has taken place.

In one embodiment of transmitter 154, there is a bidirectional, multi-stage Mach-Zehnder interferometer 179 which generates a sequence of closely-spaced mutually coherent pulses from each single pulse 178 coming from shutter 177. Additionally, interferometer 179 is also capable of adjusting the delays and amplitudes for the sequence of pulses to optimize performance, e.g. to control the shape of the interference pulse that the sequence of closely-space pulses produce after broadening.

Figure 10A:
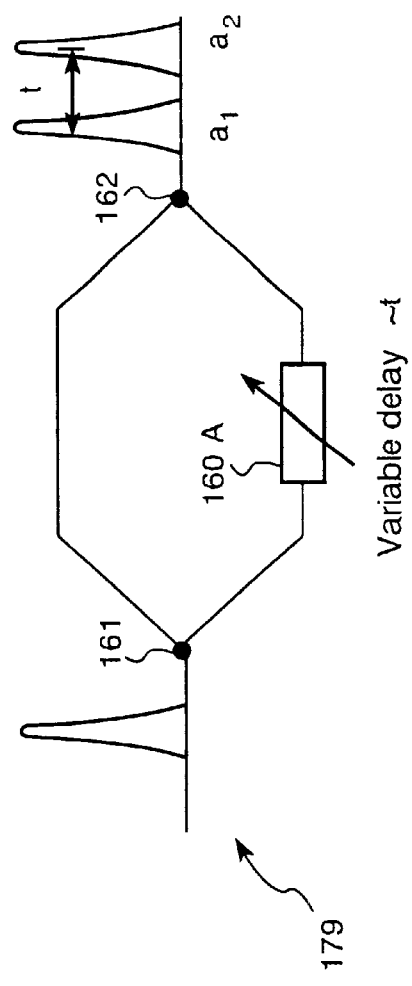

Referring to FIG. 10A, a single-stage Mach-Zehnder interferometer includes two arms, a splitter 161, and a combiner 162. Splitter 161 splits an incoming pulse into two equal intensity pulses, each of which is sent down a corresponding one of the two arms. One arm of the interferometer has a variable delay element 160A for adjusting the delay on the pulse traveling in that arm. The other arm has no variable delay element. Thus, the pulse in one arm is delayed relative to the pulse in the other arm. By varying the delay introduced by the variable delay element, the delay between the two pulses can be changed thereby changing the relative phases of the two pulses. Thus, variable delay element 160A may also be referred to as a variable phase shifter. Combiner 161 recombines the two pulses to form a sequence of two pulses that are delayed relative to each other.

Figure 10B:
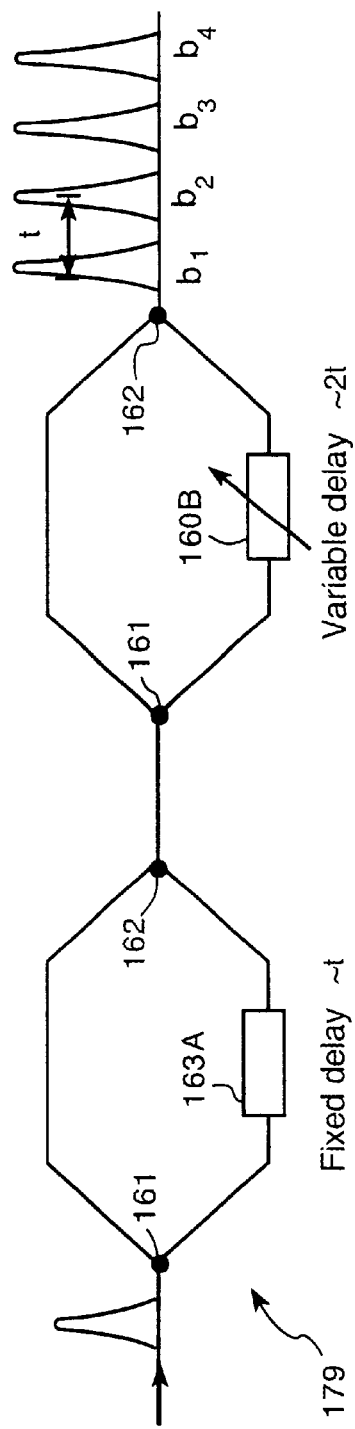

FIGS. 10B and 10C illustrate a two-stage and a three-stage Mach-Zehnder interferometer, respectively. The multistage Mach-Zehnder interferometers are constructed by serially linking multiple single stages. However, in the embodiments we have shown, all stages prior to the last one have a fixed delay element instead of the variable delay element, as described for the single stage Mach-Zehnder interferometer of FIG. 10A and only the last stage includes the variable delay element. Of course, one could also construct multistage Mach-Zehnder interferometers in which more than the last stage includes a variable delay element, and the amount of delay introduced by each delay element may be different from the ones illustrated in FIG. 10. But for purposes of explaining the operation of them, the embodiments we have chosen to illustrate are easier to understand.

The amount of delay introduced by each delay element is a factor of two greater than the delay introduced by the previous stage. That is, if a interferometer has N stages that are numbered from 0 to N−1, the delay in stage N−n is $2^{(N-n)}T$ and the variable delay element in the last stage has the longest delay equal $2^{(N-n)}T$ plus an adjustment. It should be readily apparent that since each stage introduces progressively longer delay and the last stage introduces the longest delay that the last stage essentially controls the delay between two groups of pulses. For example, referring to FIG. 10D which shows a two-stage Mach-Zehnder interferometer, the variable delay element 160D controls the separation in time between the pulses in the first group (i.e., pulses b1 and b2) and the pulses in the second group (i.e., pulses b3 and b4). If the adjusted delay is $\delta$=−0.2 t, the delay between the group of two pulses (b1–b2 and b3–b4) is changed from 2t to 2t+$\delta$, i.e., 1.8 t, and therefore the delays between the adjacent pulses of the four pulse sequence become t, 0.8 t and t, respectively. Similarly, in the three-stage Mach-Zehnder interferometer of FIG. 10C, the delay between the two groups of four pulses (i.e., pulses c1–c4 in the first group and pulses c5–c8 in the second group) can be changed from 4t to 4t+$\delta$ by adjusting the variable delay component 160C in the last stage.

Figure 11A:
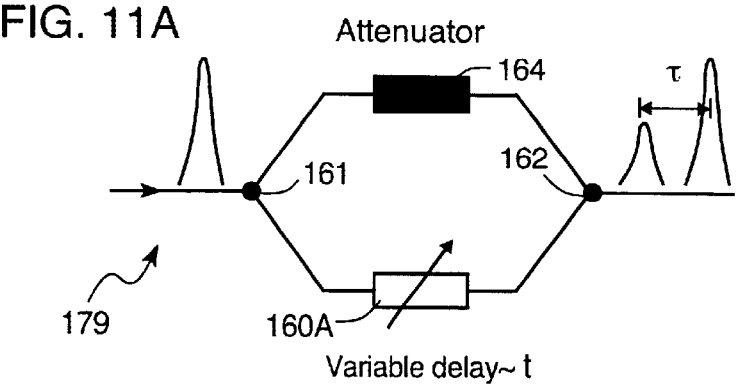
FIGS. 11A–D illustrate how the interferometer adjusts the pulse amplitude.
Figure 11B:
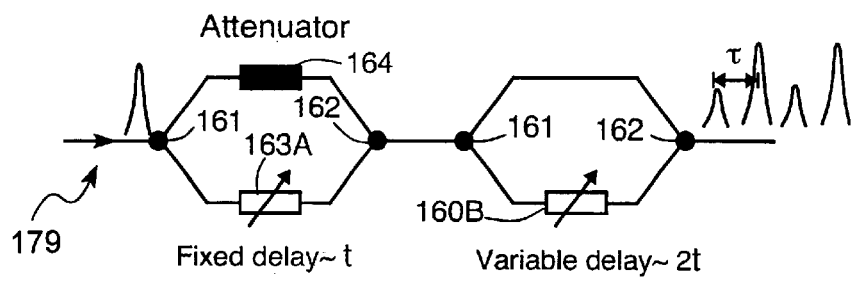
Figure 11C:
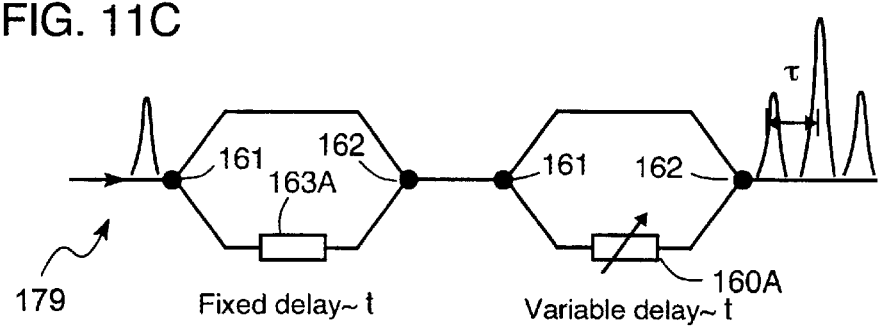
Figure 11D:
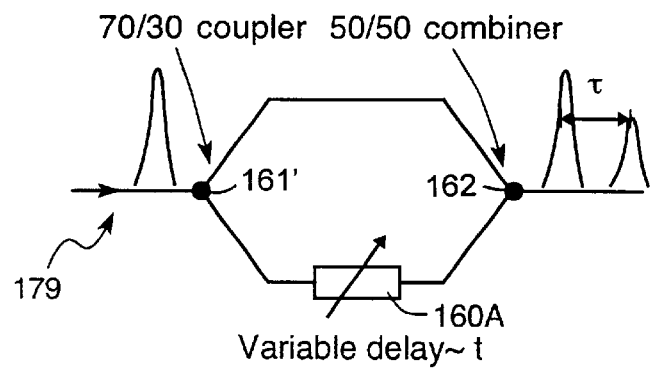

FIGS. 11A–D illustrate four alternative ways to adjust the amplitudes of the generated pulses. The pulses with adjusted amplitudes form an apodized pulse array. FIGS. 11A and 11B show, respectively, a single-stage and a two-stage interferometer with an additional attenuator in one arm of one of the stages. The attenuator changes the amplitude of the pulse passing through that arm. FIG. 11C illustrates a way of adjusting the amplitude without using an attenuator. If the delay introduced by variable delay element 160A is T instead of 2T as in FIG. 10B, the two pulses that are combined will overlay each other and form a pulse with approximately twice the amplitude. FIG. 11D illustrates that the amplitude may be adjusted with a splitter 161' that puts different weights on the two arms. In general, an X/Y splitter puts a weight of X in one arm and a weight of Y in the other arm, therefore, a 70/30 splitter splits an incoming pulse into two pulses with an amplitude ratio of 70 to 30.

With the delay and amplitude adjustability of the interferometer, the performance of transmitter 154 can be readily fine-tuned for optimal non-linear transmissions.

Figure 12:
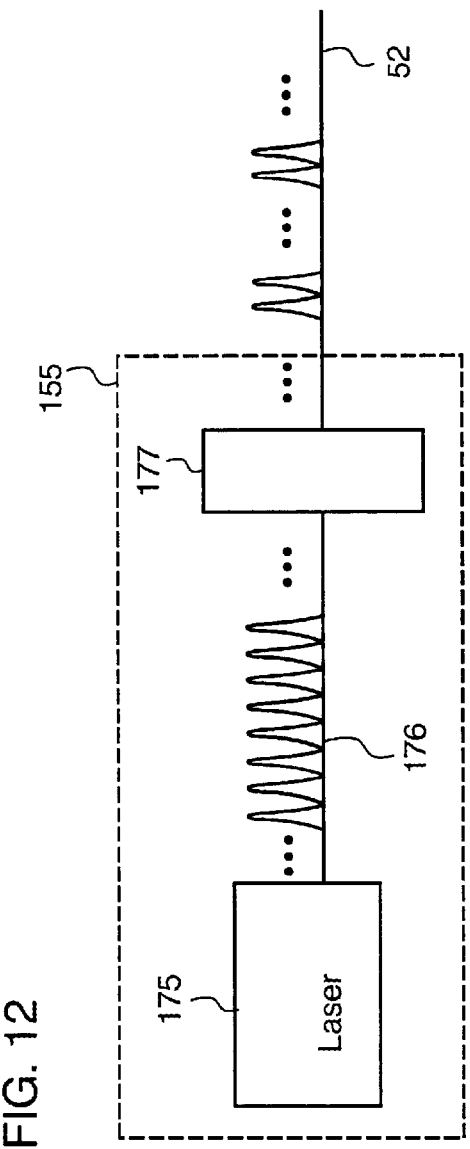
FIG. 12 shows another optical transmitter for use in the system of FIG. 7.

Another embodiment of transmitter 155 shown in FIG. 12 contains only pulse laser 175 and programmable shutter 177. Pulse laser 175 generates closely spaced coherent pulses having separations of the desired amount for producing the multiple pulses in a group which eventually interferes to form the interference pulse. Shutter 177 carves out pulses from he stream of pulses 176 generated by pulse laser 175. For example, shutter 177 may allow the first two pulses in every five pulses to pass through. Thus, shutter 177 creates groups of pulses with uniform spacing between the groups. For a pulse laser that produces a sequence of pulses with 20 ps pulse duration, the spacing between any adjacent groups of five is 100 ps. Thus, transmitter 154 transmits digital data bit at a rate of 10 Gb/s, with each bit carried by the two pulses in each group of five.

Figure 13:
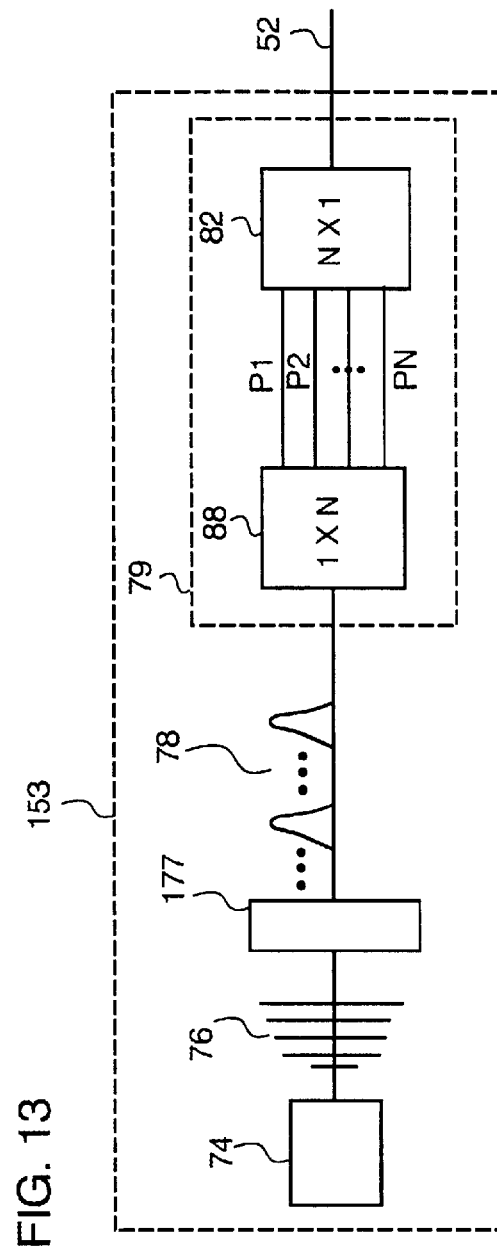
FIG. 13 shows another optical transmitter containing a pulse splitter for use in the system of FIG. 7.

Another embodiment of transmitter 153 is illustrated in FIG. 13. Transmitter 154 includes a CW laser source 74 that produces a monochromatic coherent light beam 76. Programmable high-speed shutter 177 in transmitter 153 chops light beam 76 to generate a sequence of source pulses 78. Each source pulse 78 enters a pulse splitter 79, which produces a series of N delayed and coherent pulses from the source pulse and sends the series of pulses to optical fiber 52.

Still referring to FIG. 13, pulse splitter 79 uses a 1×N beam splitter 88, e.g., a 1×N fiber coupler, to produce N mutually coherent pulses from each source pulse. The 1×N beam splitter 88 has an optical output along each of N directions, and each output couples to an optical waveguide $P_1$–$P_N$, e.g., optical fibers. Each optical waveguide $P_1$–$P_N$ has an optical length measured to produce one of the temporal delays of the series of pulses 156–159 of FIG. 7. Optical waveguides $P_1$–$P_N$ couple to an inverted 1×N beam splitter 82 that recombines the delayed pulses to produce the series of pulses 156–159 shown in FIG. 7. Pulse splitter 79 may also include optical amplifiers (not shown) either in the separate waveguides $P_1$–$P_N$ or at its output.

Figure 14:
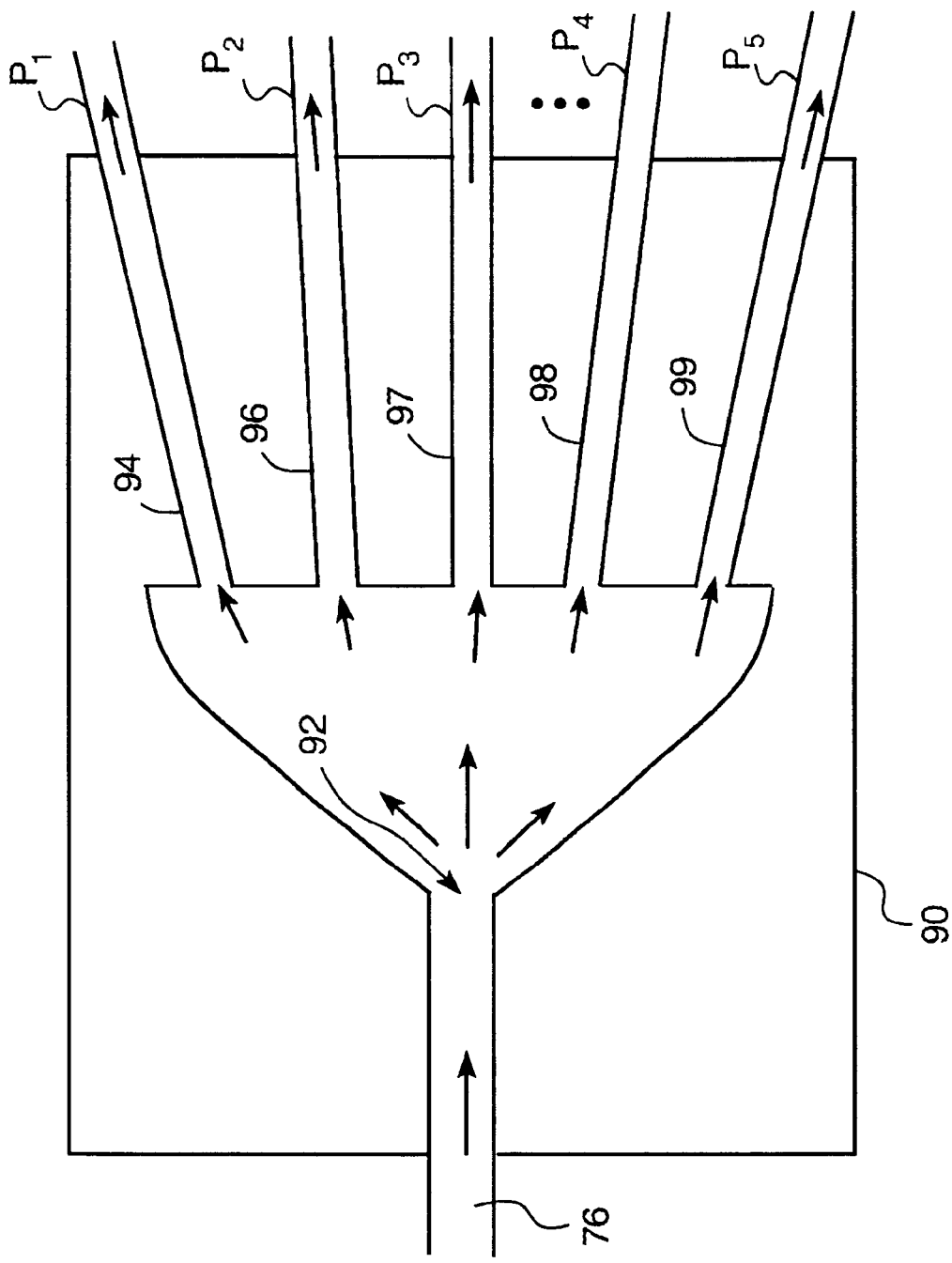
FIG. 14 shows a 1×5 optical beam splitter for use in the transmitter of FIG. 12.

Referring to FIG. 14, an embodiment of the 1×N optical beam splitter is a planar integrated optical splitter 90, which can function as the 1×N optical beam splitter 88 (for N=5). Optical splitter 90 has an input hole 92. Hole 92 diffracts each received source pulse into five mutually coherent pulses, which are directed along different directions. Each mutually coherent pulse is collected by a separate optical waveguide 94–99, which carries the pulse to an optical conduit $P_1$–$P_5$. Optical waveguides $P_1$–$P_5$ can be continuations of waveguides 94–99 or optical fibers of various lengths. Various other embodiments of the beam splitter are described in U.S. patent application Ser. No. 09/282,880, filed Mar. 31, 1999, and incorporated herein by reference.

Figure 15A:
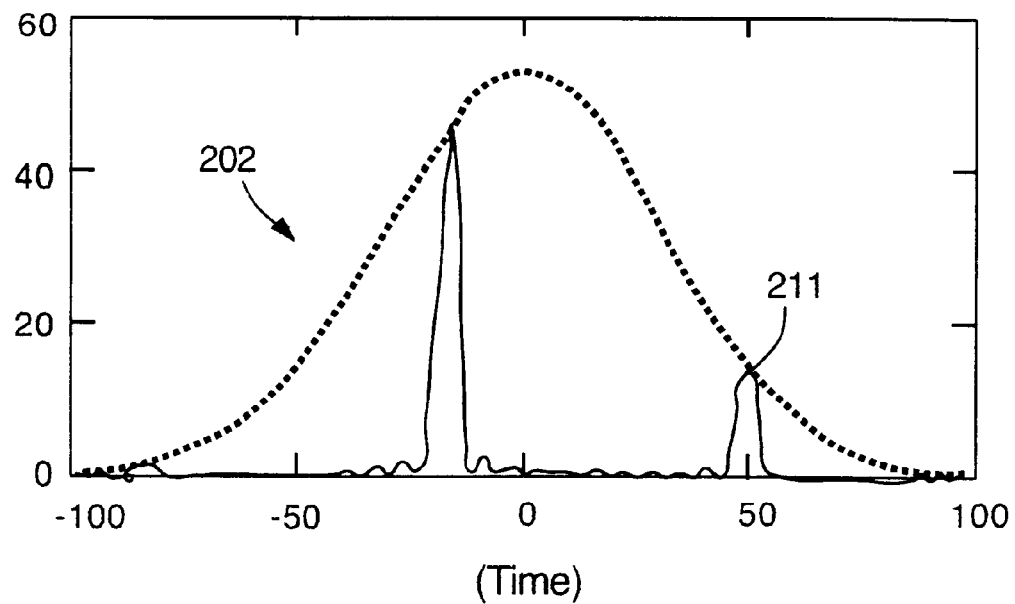
FIGS. 15A and 15B illustrate temporal shifts produced by the systems of FIG. 3 and FIG. 7, respectively.
Figure 15B:
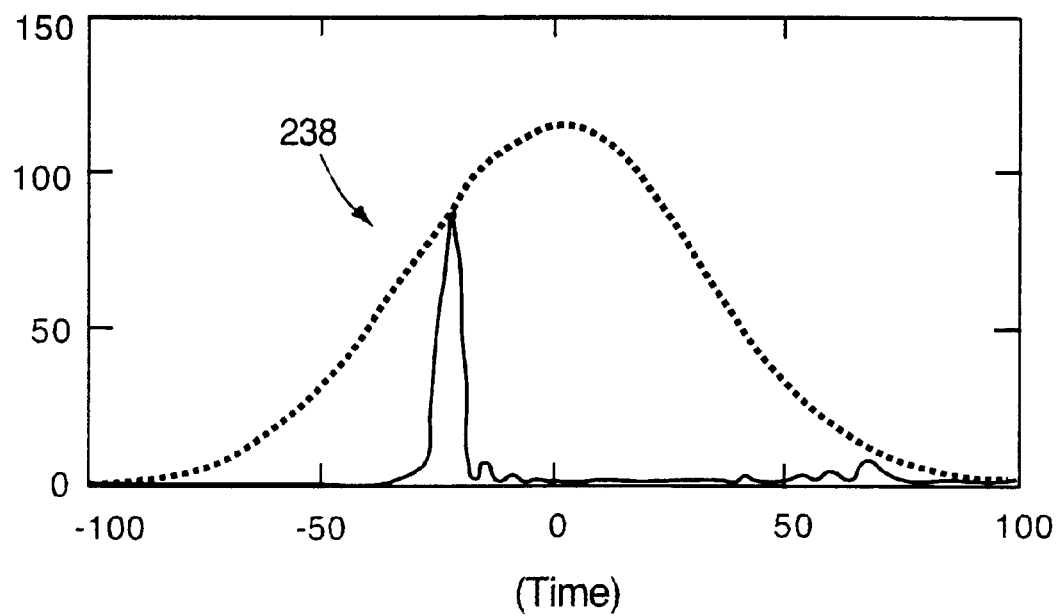

By changing the phasing and/or amplitude of the pulses within the sequence of closely-spaced coherent pulses, it is possible to shift the central lobe of the interference signal. The central lobe enhancement effect and the suppression of side lobes persists even when the central lobe of the temporal signal is shifted to either side of the center of the envelope. FIG. 15B shows the interference signal produced by a system operating in the nonlinear region and in which the phasing of the pulses has been adjusted to shift the central lobe toward the left side of the envelope.

The leftward shift of the center lobe of pattern 238 implies a change in the time at which the pulse will arrive at the receiver. In other words, shifting the center lobe is a way of introducing a delay in the pulse. In addition, it is also the case that shifting the center lobe in the time domain produces a shift towards the same direction in the center lobe in the frequency domain. In other words, the spectral content of the pulse can be altered.

A similar phenomenon occurs in the case of liner operation. However, the presence of the side lobes in the linear case seriously limits the amount of shift that can be introduced without producing an ambiguous signal. For example, FIG. 15A shows a shifted pattern 202 generated through linear operation. Notice that as the center lobe shifts to the left, the side lobe on the right also shifts to the left and grows in amplitude. Soon the side lobe will be of comparable amplitude to the shifted center lobe and it will not be possible to discriminate between the two. In contrast, the HS pulses yield a much larger dynmaic range as compared to operation in the linear region. That is, the center lobe can be shifted much farther before the much lower amplitude side lobes present a problem. Because of the wider dynamic range, a system that transmits HS pulses is truly a broadband system.

As we noted above, the frequency of the HS pulses can also be steered by adjusting the relative phases (i.e., time delays) between the pulses in the sequence of closely-spaced coherent pulses. Thus, for example, interferometer 179 of FIG. 9 and pulse splitter 79 of FIG. 14 may each be used as frequency shifters to convert the frequency of source pulses into a pre-selectable frequency for transmission.

The time and frequency steering features can be used to transmit digital data on an optical fiber. For example, the time steering feature may be used for a digital data transmission format called Pulse Position Modulation (PPM). According to the PPM format, in a temporal interval during which a digital bit is transmitted, the binary states "1" and "0" are indicated by the presence of a pulse in the first and second half of the interval, respectively; or vice versa. The frequency steering feature may be used for another data format called Frequency Shift Keying (FSK). According to the FSK format, the binary states "1" and "0" are indicated by a pulse transmitted in the temporal interval with frequency $f_1$, and $f_2$, respectively.

Figure 16:
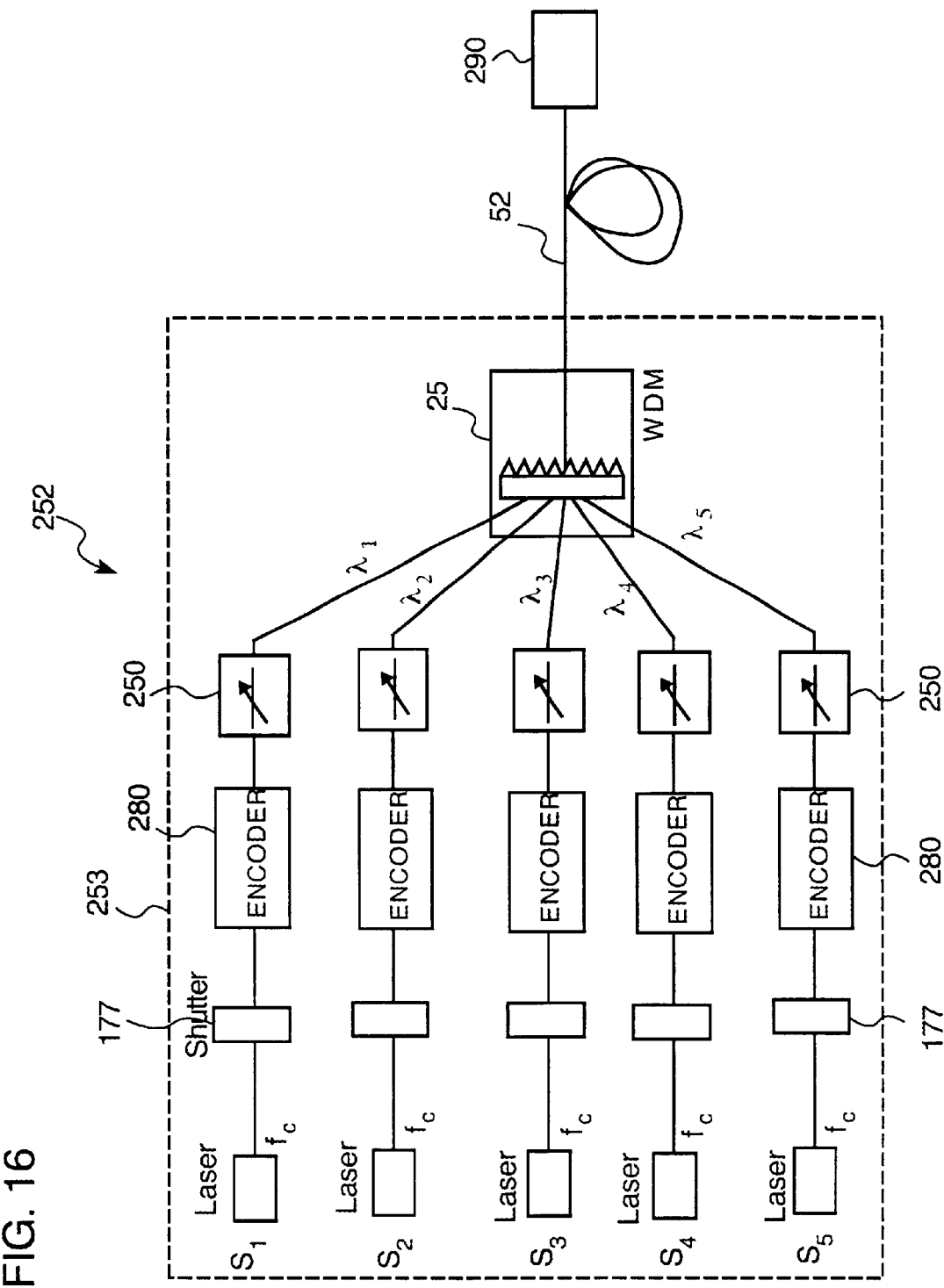
FIG. 16 shows a wavelength division optical transmission system.

The frequency steering feature is also highly useful for providing multiple channels in a multi-access digital network. FIG. 16 shows an embodiment of a nonlinear optical transmission system 252 with a transmitter 253. Each channel of transmitter 253 includes a pulse laser source (S1–S5), an optical programmable shutter 177, an encoder 280, and a channelizer 250. Encoder 280 encodes the pulses from the output of shutter 177 according to a pre-defined data format, e.g., PPM or FSK. Channelizer 250 then shifts the frequency of the pulses to a pre-determined output frequency for that channel. Both encoder 280 and channelizer 250 may be implemented by Mach-Zehnder interferometers 179, as previously described.

All of the laser sources (S1–S5) may generate pulses with the same center frequency $f_c$. Channelizer 250 shifts the frequency of the pulses for each of the input sources (S1–S5) to a distinct output frequency. As illustrated in FIG. 16, the frequencies and wavelengths generated at the output of the five transmitters are f1–f5 and λ1–λ5, respectively.

Transmitter 253 further includes a wavelength-division multiplexing (WDM) device 251 to multiplex signals from multiple sources into the same fiber 52. Fiber 52 carries multiple WDM channels, with each of the channels characterized by a unique wavelength. Each channel carries a data stream that can be encoded independent of other data streams. Thus, the WDM technique increases transmission capacity without requiring electronics of higher speed to process each channel.

Figure 17:
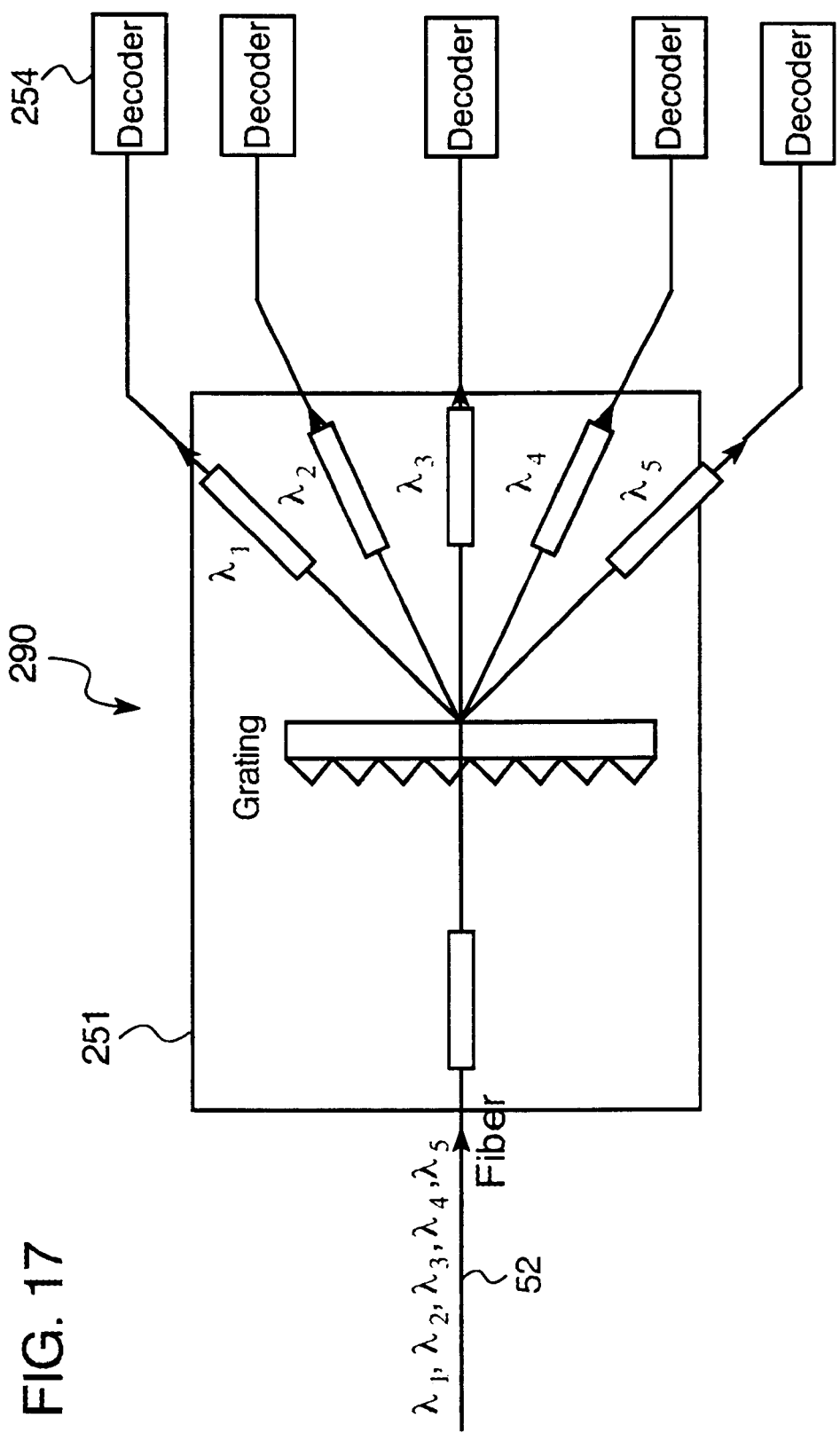
FIG. 17 shows a wavelength division optical transmission receiver.

WDM device 251 and frequency shifters 250 are in general bi-directional. Therefore, the same WDM device 251 and frequency shifters 250 used in transmitter 253 may be used in a receiver 290. Referring to FIG. 17, WDM device 251 at receiver 290 directs the multiplexed data streams in fiber 52 towards five decoders 254, each of the decoders receiving a data stream characterized by a unique wavelengths. Decoder 254 then decodes received data format (e.g., PPM or FSK). Similar to transmitter 253, decoder 254 may be implemented by Mach-Zehnder interferometers 179.

A number of embodiments of the invention have been described. Nevertheless, it will be understood that various modifications may be made without departing from the spirit and scope of the invention. Accordingly, other embodiments are within the scope of the following claims.

What is claimed is:

1. A method of generating a signal for transmission down an optical fiber characterized by dispersion and a non-linear regime of operation, said method comprising:

generating a first sequence of coherent optical pulses each of which has an associated energy, wherein the pulses in the first sequence of optical pulses are sufficiently close in spacing so that upon traveling a predetermined length down the optical fiber, the pulses of the first sequence of pulses will overlap and interfere to form a first interference pattern with a first central lobe having a characteristic wavelength, and wherein the associated energy of at least one of the pulses of the first sequence of pulses is within the non-linear regime of the optical fiber;

manipulating the pulses of the first sequence of optical pulses to generate a first manipulated sequence of pulses;

generating a second sequence of coherent optical pulses each of which has an associated energy, wherein the pulses in the second sequence of optical pulses are sufficiently close in spacing so that upon traveling a predetermined length down the optical fiber, the pulses of the second sequence of pulses will overlap and interfere to form a second interference pattern with a second central lobe having a characteristic wavelength, and wherein the associated energy of at least one of the pulses of the second sequence of pulses is within the non-linear regime of the optical fiber;

manipulating the pulses of the second sequence of optical pulses to generate a second manipulated sequence of pulses; and introducing both the first manipulated sequence of pulses and the second manipulated sequence of pulses into said optical fiber, wherein the manipulating of the pulses of the first and the second sequence of pulses shifts the characteristic wavelengths of the first and second central lobes, respectively, to first and second transmission signal wavelengths.

2. The method of claim 1 wherein each of the pulses of said first sequence of pulses has energy that is within the non-linear regime of the optical fiber.

3. The method of claim 2 wherein each of the pulses of said second sequence of pulses has energy that is within the non-linear regime of the optical fiber.

4. The method of claim 1 wherein the step of manipulating the pulses of the first sequence of optical pulses comprises changing at least one of amplitude, phase, and timing of the pulses of the first sequence of pulses relative to each other.

5. The method of claim 4 wherein the step of manipulating the pulses of the second sequence of optical pulses comprises changing at least one of amplitude, phase, and timing of the pulses of the second sequence of pulses relative to each other.

6. The method of claim 1 wherein the first sequence of pulses includes only two pulses.

7. The method of claim 6 wherein the second sequence of pulses includes only two pulses.

8. The method of claim 1 wherein generating said first sequence of coherent optical pulses comprises delivering a first coherent laser beam at a first predetermined wavelength and producing said first sequence of pulses from the first coherent laser beam.

9. The method of claim 8 wherein generating said second sequence of coherent optical pulses comprises delivering a second coherent laser beam at the first predetermined wavelength and producing said second sequence of pulses from the second coherent laser beam.

10. The method of claim 1 further comprising encoding first data onto the first sequence of pulses before manipulating the pulses of the first sequence of pulses.

11. The method of claim 10 further comprising encoding second data onto the second sequence of pulses before manipulating the pulses of the second sequence of pulses.

12. The method of claim 1 wherein introducing both the first manipulated sequence of pulses and the second manipulated sequence of pulses into said optical fiber comprises passing both the first manipulated sequence of pulses and the second manipulated sequence of pulses through a wavelength multiplexer.

13. The method of claim 1 wherein generating said first sequence of optical pulses comprises:

supplying a first continuous single coherent wave laser beam at a first preselected wavelength; and chopping the first continuous wave laser beam to produce the first sequence of optical pulses.

14. The method of claim 13 wherein generating said second sequence of optical pulses comprises:

supplying a second continuous single coherent wave laser beam at a second preselected wavelength; and chopping the second continuous wave laser beam to produce the second sequence of optical pulses.

15. The method of claim 14 wherein the first and second preselected wavelengths are the same.

16. The method of claim 1 wherein generating said first sequence of optical pulses comprises:

supplying a first single coherent optical pulse at a first preselected wavelength; and producing the first sequence of optical pulses from the first single coherent optical pulse.

17. The method of claim 16 wherein generating said second sequence of optical pulses comprises:

supplying a second single coherent optical pulse at a second preselected wavelength; and producing the second sequence of optical pulses from the second single coherent optical pulse.

18. The method of claim 17 wherein the first and second preselected wavelengths are the same.

19. An apparatus for sending optical signals down an optical fiber characterized by dispersion and a non-linear regime of operation, said apparatus comprising:

a first optical signal source which during operation generates a first sequence of coherent optical pulses each of which has an associated energy, wherein the pulses in the first sequence of optical pulses are sufficiently close in spacing so that upon traveling a predetermined length down the optical fiber, the pulses of the first sequence of pulses will overlap and interfere to form a first interference pattern with a first central lobe having a characteristic wavelength, and wherein the associated energy of at least one of the pulses of the first sequence of pulses is within the non-linear regime of the optical fiber;

a frequency shifter which during operation manipulates the pulses of the first sequence of optical pulses to generate a first manipulated sequence of pulses;

a second optical signal source which during operation generates a second sequence of coherent optical pulses each of which has an associated energy, wherein the pulses in the second sequence of optical pulses are sufficiently close in spacing so that upon traveling a predetermined length down the optical fiber, the pulses of the second sequence of pulses will overlap and interfere to form a second interference pattern with a second central lobe having a characteristic wavelength, and wherein the associated energy of at least one of the pulses of the second sequence of pulses is within the non-linear regime of the optical fiber;

a second frequency shifter which during operation manipulates the pulses of the second sequence of optical pulses to generate a second manipulated sequence of pulses; and a wavelength division multiplexer system which during operation receives both the first manipulated sequence of pulses and the second manipulated sequence of pulses and introduces them into said optical fiber, wherein the first and second frequency shifters shift the characteristic wavelengths of the first and second central lobes, respectively, to first and second transmission signal wavelengths.

* * * * *